US009721048B1

(12) United States Patent
Poplack et al.

(10) Patent No.: US 9,721,048 B1
(45) Date of Patent: Aug. 1, 2017

(54) MULTIPROCESSING SUBSYSTEM WITH FIFO/BUFFER MODES FOR FLEXIBLE INPUT/OUTPUT PROCESSING IN AN EMULATION SYSTEM

(71) Applicant: Cadence Design Systems, Inc., San Jose, CA (US)

(72) Inventors: Mitchell Grant Poplack, San Jose, CA (US); Yuhei Hayashi, San Jose, CA (US); Mark Alton Sherred, Fremont, CA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 56 days.

(21) Appl. No.: 14/864,249

(22) Filed: Sep. 24, 2015

(51) Int. Cl.
*G06F 17/50* (2006.01)
*G06F 12/0877* (2016.01)
*G06F 15/80* (2006.01)

(52) U.S. Cl.
CPC ...... *G06F 17/5045* (2013.01); *G06F 12/0877* (2013.01); *G06F 15/8007* (2013.01); *G06F 15/8053* (2013.01); *G06F 17/5027* (2013.01); *G06F 2212/1016* (2013.01); *G06F 2217/86* (2013.01)

(58) Field of Classification Search
CPC .............. G06F 17/5027; G06F 17/5045; G06F 12/0877; G06F 2212/1016; G06F 9/45554; G06F 11/3648; G06F 15/8053; G06F 9/34; G06F 9/38; G06F 9/3812; G06F 15/8007
See application file for complete search history.

(56) References Cited

U.S. PATENT DOCUMENTS

| 5,530,960 | A  | * | 6/1996  | Parks     | G06F 11/22   |
|           |    |   |         |           | 710/5        |
| 5,768,575 | A  | * | 6/1998  | McFarland | G06F 9/30003 |
|           |    |   |         |           | 712/209      |
| 5,926,832 | A  | * | 7/1999  | Wing      | G06F 9/3834  |
|           |    |   |         |           | 703/23       |
| 6,668,287 | B1 | * | 12/2003 | Boyle     | G06F 13/32   |
|           |    |   |         |           | 710/22       |
| 6,754,763 | B2 | * | 6/2004  | Lin       | G06F 15/7864 |
|           |    |   |         |           | 361/748      |
| 6,810,442 | B1 | * | 10/2004 | Lin       | G06F 17/5022 |
|           |    |   |         |           | 703/27       |
| 6,934,832 | B1 | * | 8/2005  | Van Dyke  | G06F 9/30174 |
|           |    |   |         |           | 712/244      |
| 7,941,647 | B2 | * | 5/2011  | Yates, Jr.| G06F 9/30174 |
|           |    |   |         |           | 712/220      |

(Continued)

*Primary Examiner* — Helen Rossoshek
(74) *Attorney, Agent, or Firm* — Andrews Kurth Kenyon LLP

(57) ABSTRACT

In a system and method for emulating a circuit design, an emulation system receives input instructions from a host device executing the emulation. Channels of multiple buffers and associated processors provide implement read and write instructions received at the interface. Multiple access modes are provided to read and write to system memory and to store sequences of commands in the provided buffers and to execute those stored sequences using an associated processor. By writing a sequence of commands and/or data blocks to the channel buffers, the associated processors can execute programs of varying complexity that may have been written or modified in real time or preconfigured.

26 Claims, 14 Drawing Sheets

(56) References Cited

U.S. PATENT DOCUMENTS

| | | | | |
|---|---|---|---|---|
| 8,037,228 B2* | 10/2011 | Maheshwari | ....... | G06F 13/4027 710/306 |
| 8,244,512 B1* | 8/2012 | Tseng | .................. | G06F 17/5022 703/13 |
| 8,532,975 B2* | 9/2013 | Poplack | .............. | G06F 17/5022 703/23 |
| 9,195,784 B2* | 11/2015 | Tseng | .................. | G06F 17/5022 |
| 2006/0117274 A1* | 6/2006 | Tseng | .................. | G06F 17/5022 716/106 |
| 2008/0216073 A1* | 9/2008 | Yates | .................. | G06F 9/30174 718/100 |
| 2011/0307233 A1* | 12/2011 | Tseng | .................. | G06F 17/5022 703/14 |
| 2012/0144167 A1* | 6/2012 | Yates, Jr. | ............ | G06F 9/30174 712/216 |

* cited by examiner

200

300

400

500

600

700

800

BUFFER A

| | |
|---|---|
| WR (A) | CMD 905 |
| DATA | Data 910 |
| WR (B) | CMD 915 |
| WR (A) | CMD 920 |
| DATA | Data 925 |
| BRANCH | CMD 930 |

FIG.9
900

| BUFFER B | |
|---|---|
| WAIT REG | CMD 1105 |
| RDPCI (A) | CMD 1110 |
| WR (A) | CMD 1115 |
| SET ECB | CMD 1120 |
| WAIT ECB | CMD 1130 |
| SET HCB/DA | CMD 1135 |
| SET SEQ | CMD 1140 |
| WAIT HCB | CMD 1145 |
| RD (C) | CMD 1150 |
| WRPCI (C) | CMD 1155 |
| SET ECB | CMD 1160 |
| WAIT ECB | CMD 1165 |
| WRPCI | CMD 1170 |
| DATA | Data 1175 |
| BRANCH | CMD 1180 |

MULTIPROCESSING SUBSYSTEM WITH FIFO/BUFFER MODES FOR FLEXIBLE INPUT/OUTPUT PROCESSING IN AN EMULATION SYSTEM

BACKGROUND

Aspects of the present invention relate generally to the field of circuit design and test, and more specifically to emulation systems for functional verification of circuit designs.

Integrated circuit (IC) design is increasingly complex, sometimes involving millions of elements, shapes or geometries. An electronic design automation (EDA) tool may facilitate the design by allowing a designer to interactively position ("place") and connect ("route") various shapes on the circuit. The EDA tool then creates a circuit layout containing the physical locations and dimensions of the circuit's components, interconnections, and various layers from the original design that may then be fabricated, creating the IC. The designed IC is eventually fabricated by transferring or printing the circuit layout to a semiconductor substrate in a series of layers that collectively will form the features that constitute the devices that make up the components of the integrated circuit.

After or during the design and creation of an IC layout, validation, optimization, and verification operations are performed on the layout using a set of testing, simulation, analysis and validation tools. For example, hardware designers may employ a hardware based verification platform to perform certain testing operations. Hardware verification platforms can enable testing of the various components of the design, which facilitates design analysis and debugging. Multiple aspects of the hardware design typically may be tested. For example, a hardware design may undergo architectural simulation and analysis and debugging where the functionality of each of the components being implemented in the design is tested, for example, with transaction level modeling (TLM) or bus functional modeling. The hardware design may additionally undergo circuit simulation and analysis where the signals between components are tested, for example using register transition level (RTL) analysis.

Other steps may include system simulation, for example to model the components of a system together, and system and software emulation, for example to model execution of the hardware and software elements executing on a modeled system. A common method of design verification is to use hardware emulators to emulate the circuit design prior to physically manufacturing the integrated circuit. Hardware functional verification systems typically utilize arrays of processing devices or programmable logic devices, and to verify circuit designs. Processor-based emulators sequentially evaluate the design under verification, starting at the inputs and proceeding to the outputs, allowing engineers and hardware designers to test and verify the operation of an integrated circuit, an entire board of integrated circuits, or an entire system without having to first physically fabricate and manufacture the electronic hardware.

Field Programmable Gate Arrays (FPGAs) have been used to connect the designs undergoing emulation to the emulation system using a peripheral component interconnect (PCI) data bus. FPGAs are programmable so the system designer's logic for the connection can be modified as necessary. However, in order to accelerate the time consuming emulation and simulation process, it is preferable to optimize performance by moving the interface logic to one or more Systems on a Chip (SOCs), but this move requires that the interface logic be established before the chips are manufactured and therefore lacks flexibility. Making changes to interface logic, for example to provide real-time access and editing, is severely restricted.

Accordingly there is a need in the art for an emulation system that provides flexible access to the emulation processes and test logic without using FPGAs in the datapath to the host system.

BRIEF DESCRIPTION OF THE DRAWINGS

The foregoing and other aspects of various embodiments of the present invention will be apparent through examination of the following detailed description in conjunction with the accompanying drawing figures in which similar reference numbers are used to indicate functionally similar elements.

FIG. 9 illustrates an exemplary buffer that receives input according to a buffer access mode.

FIG. 11 illustrates an exemplary buffer that receives and stores a command sequence according to a buffer access mode.

DETAILED DESCRIPTION

Aspects of the present disclosure describe an I/O Processing Subsystem that facilitates connecting one or more host system(s) with multiple chips to emulate a hardware design. The interface may be used for control and data communications between hosts and Application Specific Integrated Circuits (ASICs), including design and debug data upload and download, as well as command and control.

Systems and methods are provided for emulating a circuit design with the described I/O Processing Subsystem. According to an embodiment, an emulation system receives input instructions from a host device executing the emulation. Channels of buffers and associated processors are provided as an interface to system memory. The buffers and processors use the instructions to implement various commands. The buffers can be set to either a FIFO mode or a buffer mode depending on the access mode being used by the instruction and information, such as an opcode, provided in the instruction. Certain instructions will include target buffer and system memory addresses, while other instructions may include only a target buffer address.

Multiple access modes may be provided, including: (1) direct memory access mode wherein the channel buffers and processors pass data to/from the interface from/to the memory system; (2) FIFO access mode wherein sequences of read and write commands and associated data blocks can be written to a FIFO buffer and then are executed in sequence by an associated processor; (3) buffer access mode wherein sequences of commands, including commands that may branch or jump, and associated data blocks can be written to a buffer and then are executed by an associated processor; (4) buffer execution mode wherein an instruction triggers execution of a program or sequence of commands previously written to a buffer; and (5) register access mode wherein a register value is written or read. By writing a sequence of commands and/or data blocks to the channel buffers, the associated processors can execute programs of varying complexity that may be written or modified in real time.

Figure 1:
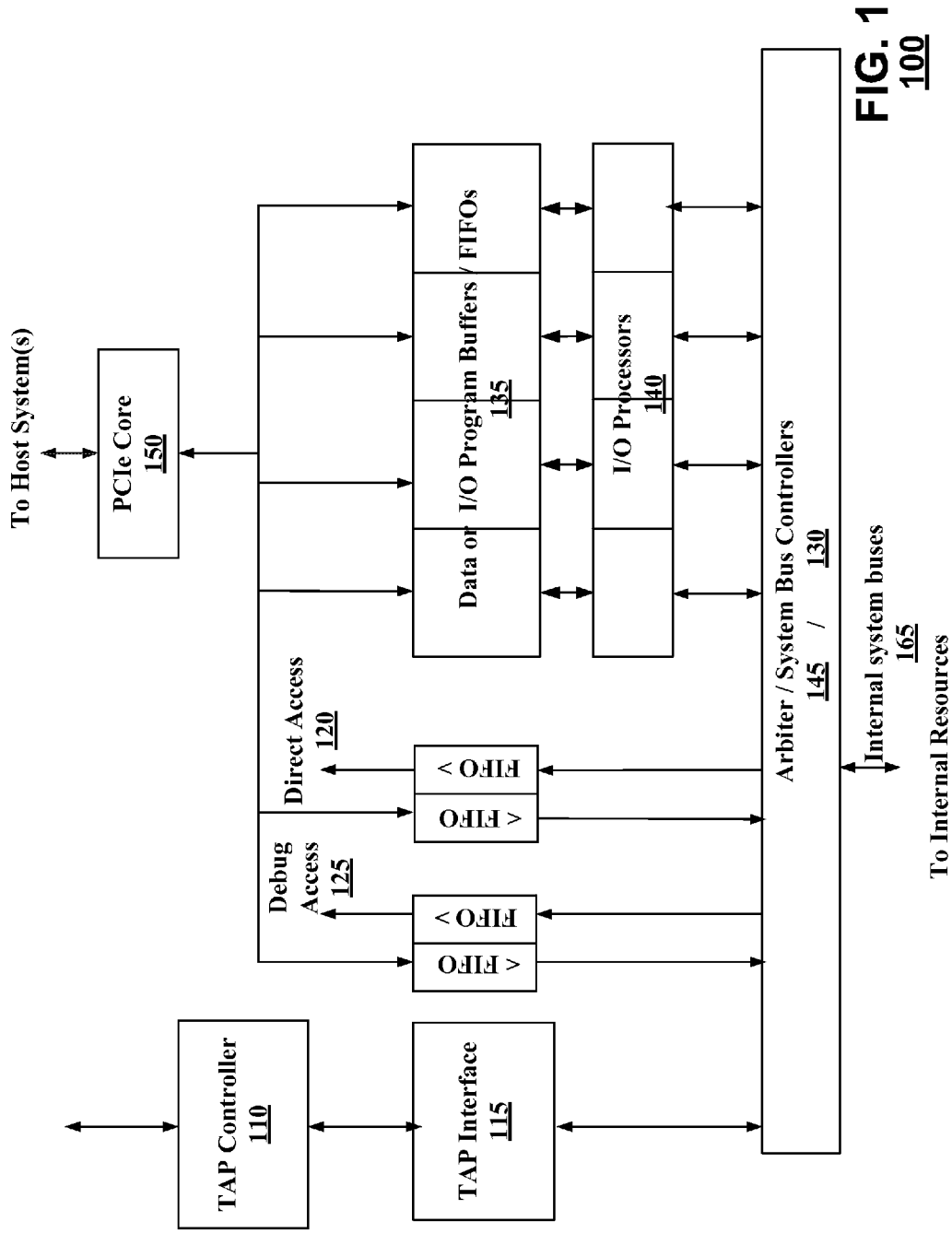
FIG. 1 is a simplified block diagram that illustrates an exemplary I/O processing subsystem according to an embodiment of the present disclosure.

FIG. 1 is a simplified block diagram that illustrates an exemplary I/O processing subsystem 100 according to an embodiment of the present disclosure. The I/O processing subsystem 100 consists of a number of I/O Processors (IOPs) which can run in parallel to interface between a PCIe bus and the Internal System Buses (ISB). As shown in FIG. 1, the system 100 includes a test access port (TAP) controller 110 which allows test and debug access to the system. For example, access may be provided according to a standard protocol such as JTAG. The TAP controller 110 may be a finite state machine, for example a 16-state FSM, that is responsive to commands received via the TAP. The system 100 also includes a TAP interface 115 which interfaces between the TAP controller 110 and the internal memory space of the system.

Data may be provided from the PCI interface provided by PCIe Core 150 to system memory accessed via an internal bus system 165 via multiple channels, for multiple sources of data. For example, data may be passed straight through a channel to the bus controller and ultimately to the internal memory space. Alternatively, the data passed into one of the multiple channels may be processed as instructions, may simply be buffered in one of the channel buffers, or may contain instructions that control the data input into other channels. These channels, comprising buffers and processors for handling the data put into the buffers, are described in further detail below.

The system may include direct access FIFO buffers 120 that facilitate PCI direct access to the internal memory space, and debug access FIFO buffers 125 that facilitate PCI debug access to the internal memory space. The system 100 also may include multiple I/O buffers (IOBs) 135 that may be used for data and/or I/O programs and multiple I/O processors (IOPs) 140 that interpret received commands and route data between buffers and the internal system bus. An IOB can be set to FIFO mode or to buffer mode. Buffer mode may be used when the buffered data contains an I/O program that may be reused or that branches. FIFO mode may be used when the buffered data is simply passing through the buffer, if the buffered data is larger in size, or if the buffered data includes a short linear program, such as a list of short writes. According to an embodiment, there may be one IOP for every IOB.

An IOB can be configured as an input-output FIFO pair or as a buffer memory. According to an aspect of an embodiment, a register, such as an IOP process state register may indicate the state of the IOB.

When used for data only, the IOB may be accessed by commands generated from another IOP (and PCI command). In this case, the choice of FIFO mode or buffer mode depends on the application being executed via the IOP. When an IOB is in buffer mode to execute IOP programs, this looks and acts like a common single-memory CPU architecture where the IOP can execute programs and access data from the memory.

When an IOB is in FIFO mode, the associated IOP looks like a list processor, as it only acts on the tail of the input FIFO. For example, the IOP still has access to its entire instruction set and registers, programs can still contain commands and data, variables and other data are available, and blocks of data can still be embedded in the sequence. However, any references to the IOB can only access the tail of the input FIFO. Specifically, blocks of data embedded in the sequence must follow the instruction which references them. Random access to the IOB is not available. Branch and jump instructions are available, but they may only jump in the forward direction, resulting in the specified number of words being dequeued and discarded.

When in FIFO mode an associated IOB may know the fullness state of the buffer, but the IOP also needs to know the amount of expected data so that the IOP can properly initiate unloading of the FIFO. The expected data may be provided in a length field in the header of the received data.

When an IOB is in one mode but is accessed in another mode, any data in the IOB may be flushed to allow the new access. Additionally, the unanticipated mode switch may trigger generation of an error message or other error handling.

The IOPs 140 and associated IOBs 135 provide an interface between the PCI interface provided by the PCIe core 150 and the system memory, and provide programmability for control and data transfers so that the usage needs of the chips and PCI connected devices need not be known at RTL design time. Furthermore, the IOPs 140 provide significant flexibility that provides a mechanism for workarounds and for modifying instructions and behavior in real time.

According to an embodiment, an exemplary system configuration may include 12 IOPs 140 with corresponding IOBs 135, a single debug FIFO 125, and a single direct access FIFO 120, for a total of 14 channels. The IOB associated with each IOP may provide 8 k×64 b of memory where each IOB can be configured as a 4 k×64 b input FIFO and a 4 k×64 b output FIFO when in FIFO mode. In buffer mode, each IOB may be configured as a single 8 k×64 b buffer.

The I/O processing function of IOPs may be used to process data and perform the sequenced operations of programs loaded into the system. For example, a particular program can be executed once, as with a list of packaged instruction sent one time by the host; occasionally, as triggered by either a write from the host or from virtual (emulated) logic; often and regularly, as with certain simulation acceleration lockstep modes; or all the time, as with a program that is put into a loop based on an internal status. Data associated with a program can be placed in a separate IOB as the sequence of instructions or will follow the instructions in the IOB.

IOPs may execute a number of different types of program instructions, including, for example: a write instruction which causes the IOP to write data from the associated or other buffer to the system memory space; a read instruction which causes the IOP to read data from the system memory space into a buffer; an initiate download instruction to initiate a PCI download from the PCI host to a buffer; an initiate upload instruction to initiate a PCI upload from a buffer to a PCI host; a synchronization instruction which will cause the IOP to wait for some condition before proceeding, atomic test, set, and modify instructions which operate on a lock; a branch instruction which will cause the IOB to access an addressed buffered command; and a halt instruction to halt processing operations. Synchronization instructions may include conditions denoting waiting for a particular step number within an emulation cycle, an emulation cycle number, a condition under virtual control via Hardware Control Bits (HCBs), a condition under virtual and system-wide control via Embedded Control Bits (ECBs), a state of another IOP or IOB, or the state of a lock.

Figure 2:
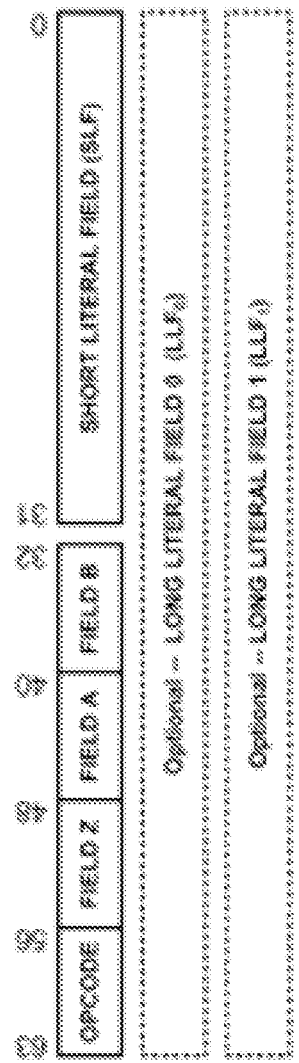
FIG. 2 illustrates an exemplary instruction according to an embodiment of the present disclosure.

According to an embodiment, an IOP instruction may be a sequence of 64-bit words. A short instruction may be a single word long whereas long instructions may be comprised of multiple words. FIG. 2 illustrates an exemplary instruction 200 according to an embodiment of the present disclosure. As shown in FIG. 2, an exemplary instruction may include an opcode field and up to three parameters (fields A, B, and Z). The opcode field may signal the access mode to be used for processing the instruction. According to an embodiment, fields A and B may contain operands or inputs into stored programs, and field Z may be an address or otherwise indicate an output destination.

Each IOP may have a set of associated registers (not shown). For example, each IOP may have access to 16 64 bit registers which are not accessible by other IOPs in the system. The non-shared register space can be used for temporary storage of variables for complex I/O programs or for backing up chip registers that need to take on different states between different I/O programs. Each IOP may also have access to a set of shared registers accessible by every IOP. Other registers may also be implemented, for example, each IOP may access a carry out register which updates from ADD and SUB instructions only and contains 0 or 1 depending on whether an arithmetic carry was generated, and an error register which contains bits which signal unintended programming or conditions.

Additionally, there may be a memory space (not shown), accessible through the internal system buses 165, which is not reserved for any other chip resource, and is not accessible to virtual logic, but which can be used when an I/O program needs access to more memory, and can be used as shared memory between I/O programs. IOPs may also have access to a set of locks, for example semaphores, which may be used for synchronization between different I/O programs and to lock access to particular chip resources.

An arbiter 145 controls priority of access to the internal system buses 165 and resolves conflicts, whereas the internal system bus controllers 130 control internal buses 165 and serve as the internal direct memory access (DMA) engines.

The IOPs may be configured to allow multiple different types of access to the system memory. The multiple access modes can facilitate receiving different types of messages and provide different methods for accessing internal memory space.

According to an embodiment, a first access mode may provide direct access to the memory resources. In this first access mode, a PCI host interface will command an appropriate IOP based on the PCI header of the incoming data. For example, in the case of a write instruction, the payload data of the incoming data is inserted into an appropriate FIFO or IOB in FIFO mode. As part of the incoming data, the PCI address will direct which FIFO to use for the incoming data and may also identify an ultimate target address in the internal memory space.

A host system, such as a personal computer or workstation, may convert the hardware design into a sequence of instructions that can be emulated by the I/O Processing System described herein. The host system, accessing the I/O Processing System via the PCI interface, may not be aware of the data channels provided by the IOPs and IOBs, but rather will simply perform memory accesses. The direct access mode may be the primary mode of access for most applications, particularly applications that do not require special IOP functionality such as interlocking, programmability, or performance.

Returning to FIG. 1, the direct access FIFOs 120 and debug access FIFOs 125 provide simple access to chip resources in a memory-mapped fashion. The direct and debug FIFOs may be used to access internal memory according to the direct access mode only as the direct access FIFOs 120 and debug access FIFOs 125 do not support instructions and they do not have associated registers. An IOB 135 operating in FIFO mode may provide the same functionality as the direct 120 and debug 125 FIFOs, particularly if there are no direct access FIFOs 120 or debug access FIFOs 125 available.

Figure 3:
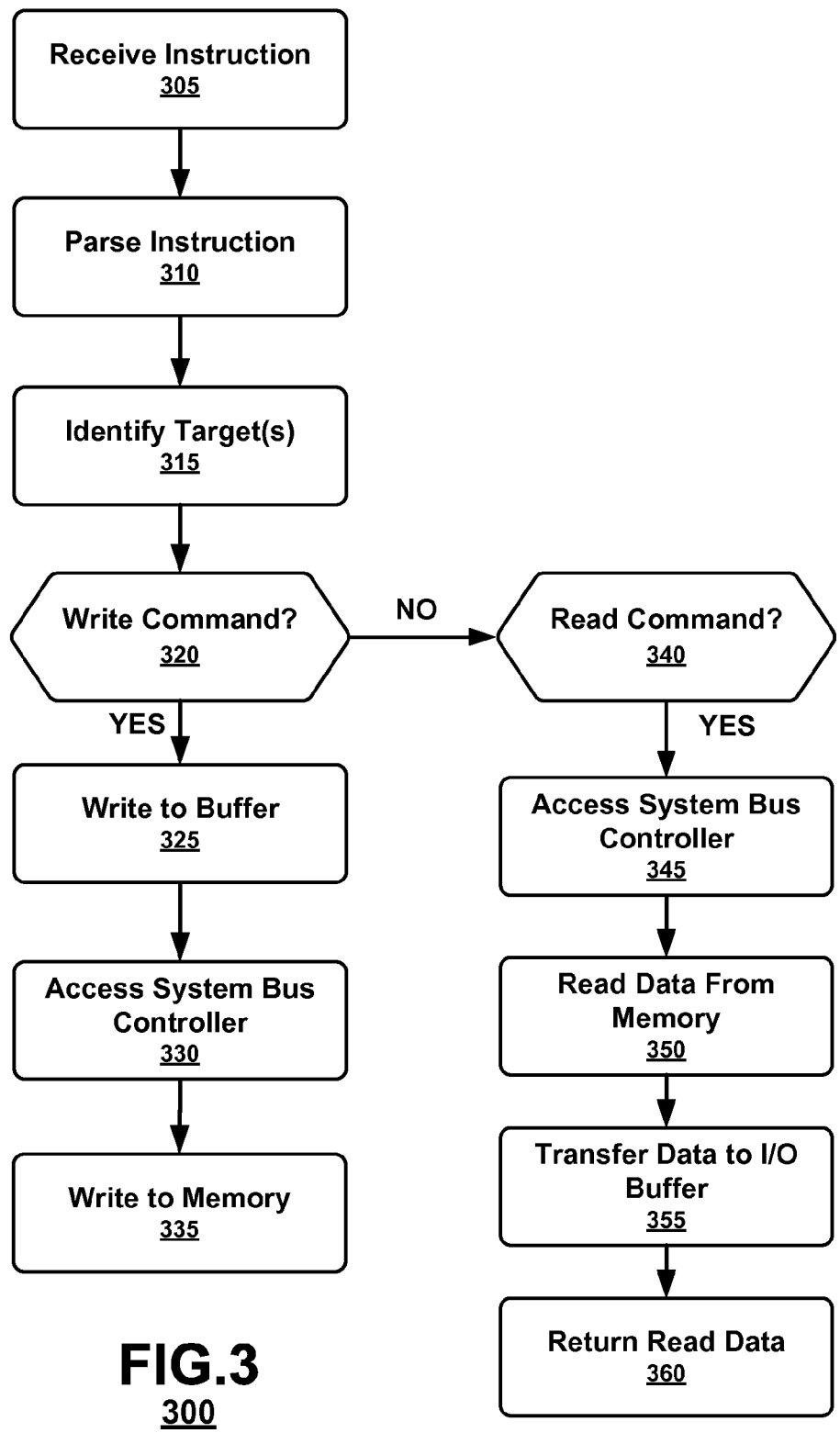
FIG. 3 illustrates an exemplary method for using the emulation system according to a direct access mode.

FIG. 3 illustrates an exemplary method 300 for using the emulation system according to a direct access mode. As shown in FIG. 3, an instruction will be received at an interface, such as a PCI interface (block 305), and parsed to identify a header and a payload of data (block 310). The instruction may contain address information including a target buffer and the ultimate target in memory (block 315). The target buffer may be an IOB in FIFO mode or a FIFO buffer. If the instruction is a DMA write command (block 320), the payload data may then be stored in the target FIFO (block 325) and the DMA instruction will be passed to a system bus controller (block 330). Then the payload data will be written to the ultimate target address in the internal system memory as instructed in the write command (block 335).

If the instruction is not a write command (block 320), the instruction may be a direct memory access read command (block 345). The memory access instruction may then be passed to the system controller (block 350) and the requested memory read from the internal system memory as instructed in the read command (block 355). The read data may then be transferred to the target IOB (block 360) and returned by the IOP to the requesting device (block 365).

A second access mode may provide deposit of incoming data into an IOB in FIFO mode without reference to an ultimate target address in system memory. In this FIFO access mode, the PCI host interface logic may not issue any commands, but rather will include address information that may be used to facilitate the selection of a target FIFO buffer.

The FIFO access mode may be used to accelerate access to a large block of data. For example, one large block of data may be packaged as a single transaction rather than multiple little transactions. In this instance, the incoming information may include both commands and data but the ultimate target memory space may be determined by the commands embedded in the data payload.

For example, if an input includes commands embedded with the data in the payload and the addressed target buffer is a buffer in FIFO mode, blocks of data sent to this buffer may contain data to be written to multiple locations in sequence. Then, the IOP may perform a sequence of writes which require, for example, adjustments to modes, byte enables, etc. Or the IOP may perform a sequence of small writes without the inefficiency of multiple initiating transactions.

Additionally, the FIFO access mode may be used to deposit data into a buffer such that the associated IOP may be used strictly for data while another, potentially preprogrammed, IOP will determine when to perform a sequence of accesses on that data. In this instance, the incoming data payload may include only data without any associated embedded commands. Related internal bus transactions, and the ultimate target in memory space, may be determined by the preprogrammed IOP.

In FIFO access mode, a PCI read instruction will cause data to be fetched directly from the FIFO buffer, without any regard for how the data got there. Therefore, for a read instruction in FIFO access mode, the data must have been fetched to the FIFO buffer via a previous sequence of commands or under the direction of a different IOP.

Figure 4:
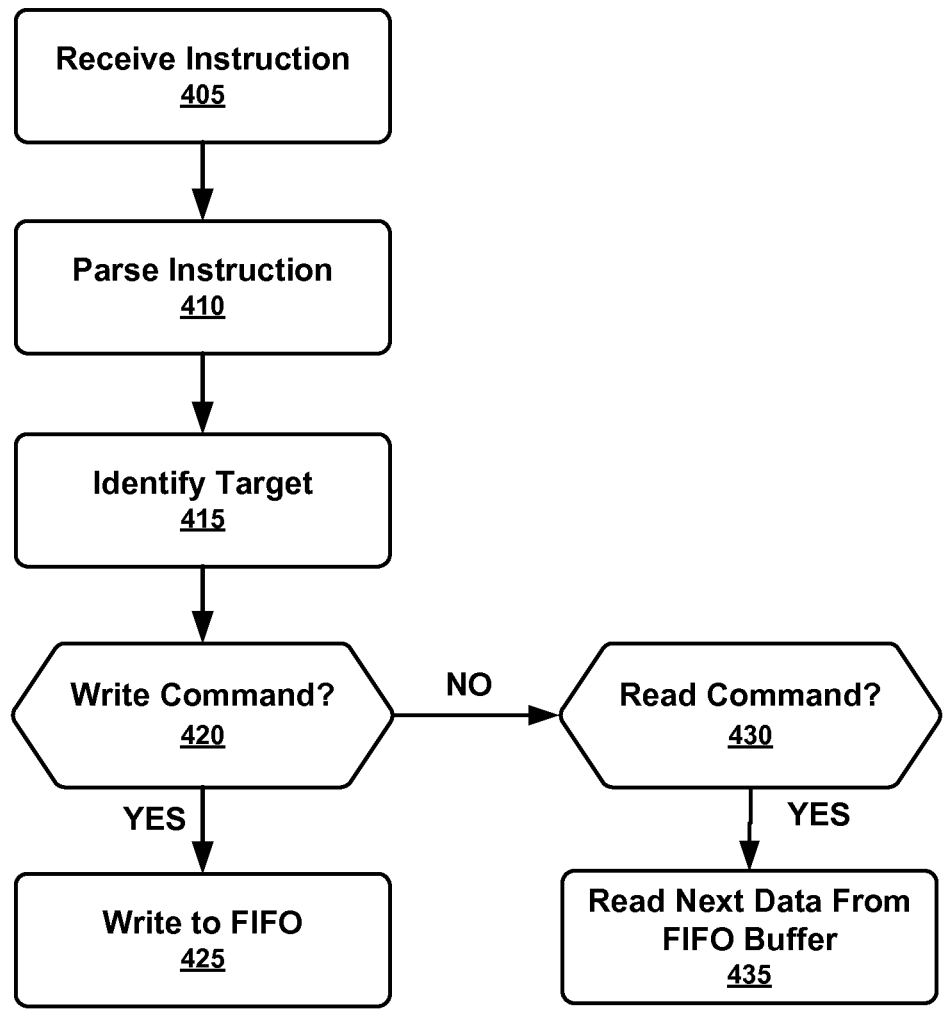
FIG. 4 illustrates an exemplary method for using the emulation system according to a FIFO access mode.

FIG. 4 illustrates an exemplary method 400 for using the emulation system according to FIFO access mode. In FIG. 4, an instruction may be received at an interface (block 405) and parsed to identify header information and a payload of data (block 410). An address that identifies a destination FIFO may be included in the header and processed by a PCI host interface (block 415). If the instruction is a write command (block 420), the payload data will be written to the appropriate FIFO as identified (block 425). The target FIFO may be an IOB in FIFO mode.

If the instruction is not a write command (block 420), the instruction may be a read command (block 430). The read instruction may include the address of a FIFO buffer to read from. Then, the data in the addressed FIFO will be returned to the requesting device (block 435).

According to an embodiment, input data may include a programmed block with multiple commands and data blocks in the input payload data. The payload data may be directly stored in a target IOB and then the associated IOP will step through the commands and data stored in the IOB and execute the embedded write commands.

Figure 5:
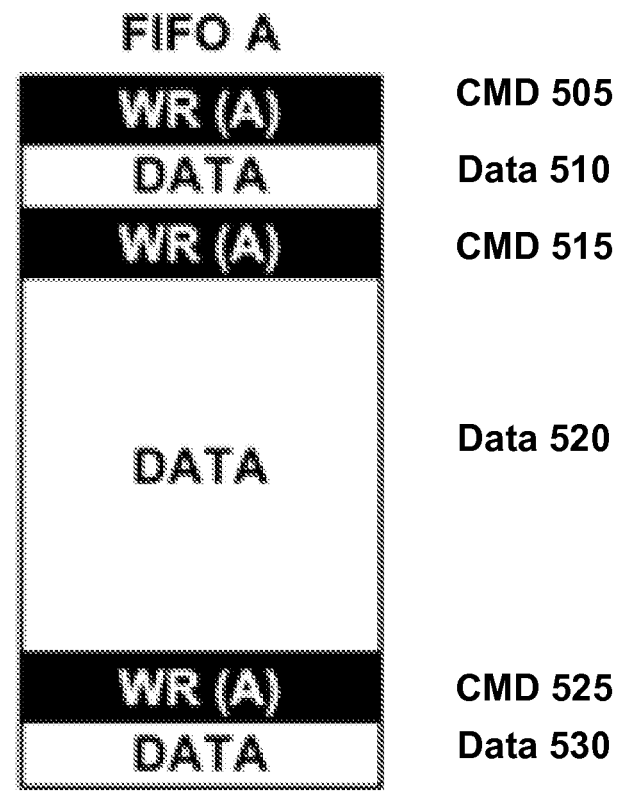
FIG. 5 illustrates an exemplary buffer that receives input according to a FIFO access mode.

FIG. 5 shows an exemplary buffer 500 that receives and stores an input payload according to a FIFO access mode. In FIG. 5, FIFO buffer A stores commands 505, 515, and 525 and data blocks 510, 520 and 530. An associated IOP may step though the sequence of commands and data and perform the instructions provided in the commands. As shown in FIG. 5, this may include accessing write command 505 which will cause data 510 to be written to memory, accessing write command 515 which will cause data 520 to be written to memory, and then accessing write command 525 which will cause data 530 to be written to memory. The embedded write commands may contain information, such as address information, that may be passed to the system bus controller to execute the write.

Figure 6:
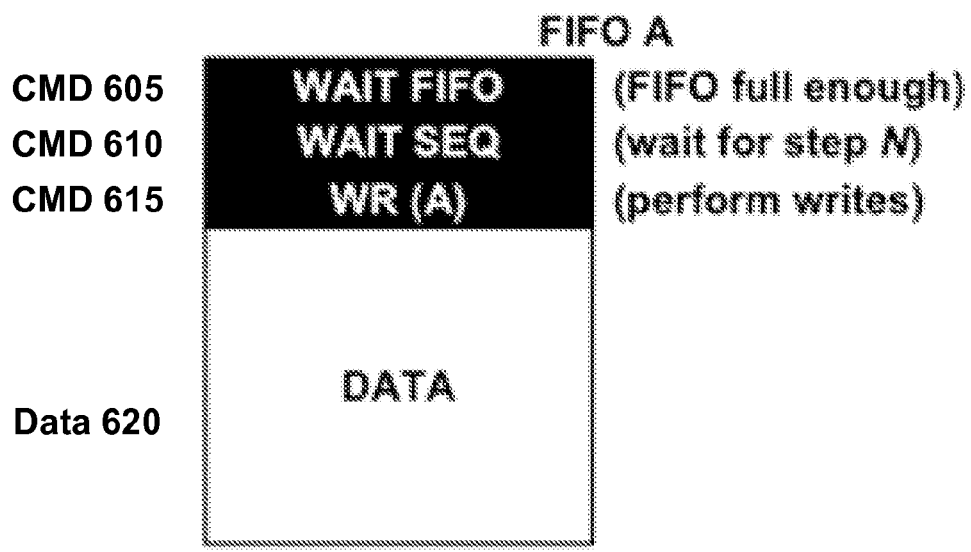
FIG. 6 illustrates an exemplary buffer that receives input according to a FIFO access mode.

The FIFO access mode may be used to facilitate a synchronized write. For example, if several writes must happen within the same emulation cycle, the IOPs may synchronize to a known part of the cycle before executing the write commands. FIG. 6 shows an exemplary buffer 600 that receives and stores an input payload according to a FIFO access mode. In FIG. 6, the FIFO buffer A 600 stores commands 605, 610, and 615 and data block 620. An associated IOP may step though the sequence of commands and data and perform the instructions provided in the commands. As shown in FIG. 6, this may include waiting until an expected amount of data has been received at the FIFO buffer A as instructed by command 605, waiting for a predefined emulation step N as instructed by command 610, and then accessing write command 615 which will cause data 620 to be written to memory. The IOP may be triggered during a waiting step by another IOP, by a detected update to a register, or by some other signaling method.

The FIFO access mode may also be used to facilitate a synchronized write among multiple chips. For example, the system may wait until all the data is received, and then signal completion using embedded control bits (ECBs) to initiate execution of stored commands. The use of ECBs and additionally Hardware Control Bits (HCBs) is described in additional detail in U.S. patent application Ser. No. 14/864, 335 entitled "Data Compression Engine for I/O Processing Subsystem," filed concurrently herewith, the disclosure of which is incorporated by reference herein in its entirety.

Figure 7:
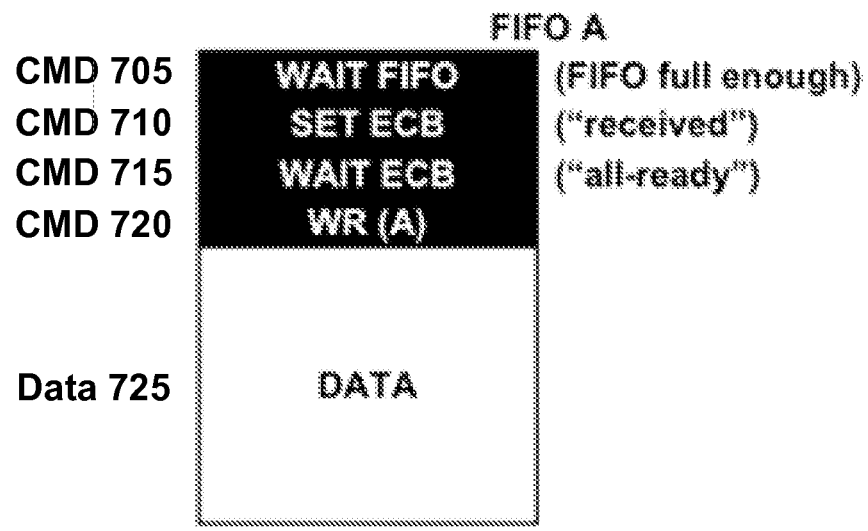
FIG. 7 illustrates an exemplary buffer that receives input according to a FIFO access mode.

FIG. 7 shows an exemplary buffer 700 that receives and stores an input payload according to a FIFO access mod. In FIG. 7, the FIFO buffer A 700 stores commands 705, 710, 715, and 720 and data block 725. An associated IOP may step though the sequence of commands and data and perform the instructions provided in the commands. As shown in FIG. 7, this may include waiting until an expected amount of data has been received at the FIFO buffer A as instructed by command 705, set an ECB trigger as instructed by command 710, waiting to receive an indication from the ECBs that the trigger condition has been met as instructed by command 715, and then accessing write command 720 which will cause data 725 to be written to memory.

A third access mode may provide direct access to an IOB in buffer mode. This mode may be used to read or write the content of an IOB, such as a program, and to download data that will persist and may be processed by another IOP. In this buffer access mode, the address information may provide the address into the buffer only without reference to an ultimate destination in system memory, and the payload contains the data to be deposited in the buffer. In this instance, the payload information may be data only or may include both commands and data.

Figure 8:
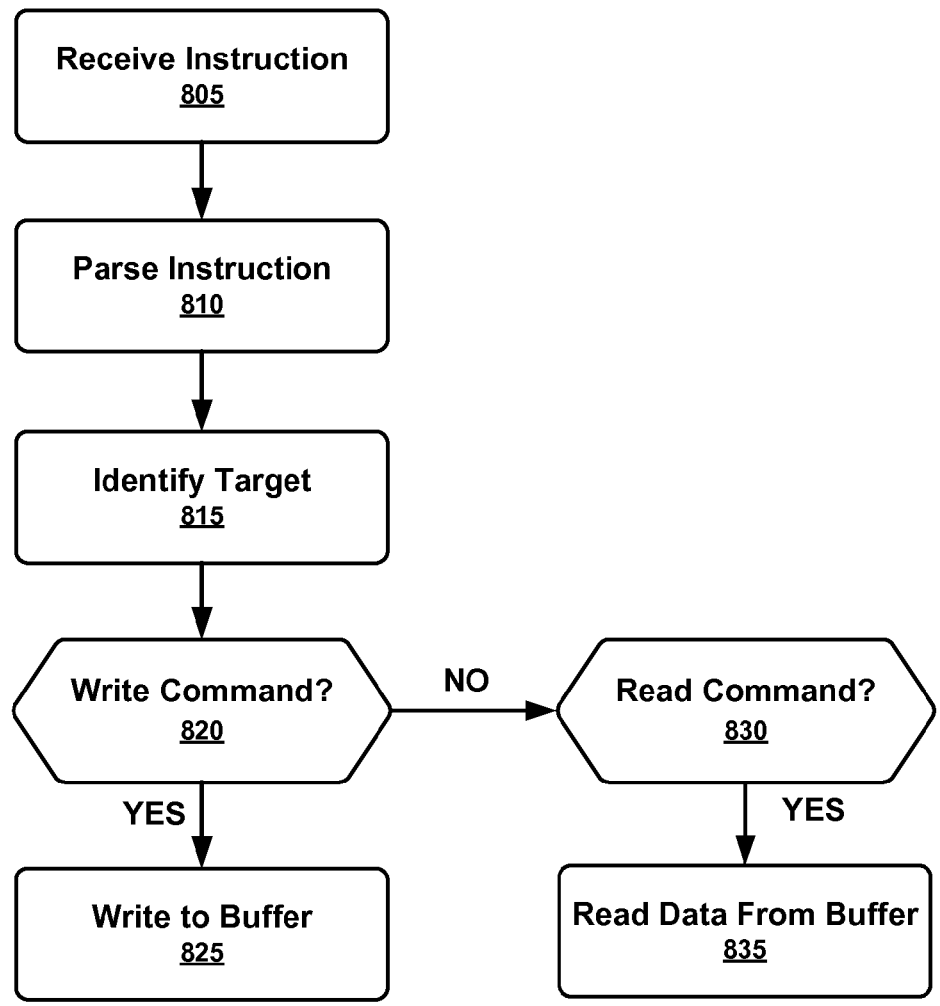
FIG. 8 illustrates an exemplary method for using the emulation system according to a buffer access mode.

FIG. 8 illustrates an exemplary method 800 for using the emulation system according to a buffer access mode. In FIG. 8, an instruction may be received at an interface (block 805) and parsed to identify information in a header and a payload of data (block 810). Address information that identifies a destination buffer may be included in the header and processed by a PCI host interface (block 815). The instruction may contain address information that identifies a target buffer. The target buffer may be an IOB in buffer mode. If the instruction is a write command (block 820), the payload data will be written to the appropriate buffer as identified (block 825). If the instruction is not a write command (block 820), the instruction may be a read command (block 830). Then, data stored in the target IOB will be returned to the requesting device (block 835).

Figure 10:
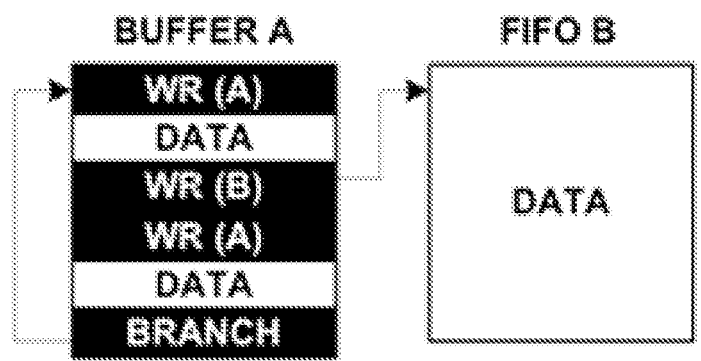
FIG. 10 illustrates the execution of commands in an exemplary buffer configured according to a buffer access mode.

The buffer access mode may facilitate execution of repetitive commands that require some additional setup. For example, commands may be stored in one buffer, potentially with some hardcoded data. Then, blocks of data may be processed by the IOP and potentially transmitted to a second buffer. FIG. 9 shows an exemplary buffer 900 that receives input according to a buffer access mode. In FIG. 9, buffer A 900 stores commands 905, 915, 920, and 930 and data blocks 910 and 925. The sequence of commands and data may be stored in the buffer 900 until accessed by an IOP. FIG. 10 illustrates the execution of the commands in buffer A 900. For example, IOP A associated with buffer A 900 may step though the sequence of commands and data and perform the instructions provided in the commands. As shown in FIG. 10, this may include accessing write command 905 which will cause data 910 to be written to memory, accessing write command 915 which will cause data not stored in buffer A 900, for example register data or data blocks transmitted from the host, to be written to another buffer, FIFO buffer B. Accessing write command 920 will cause data 925 to be written to memory. A branch instruction 930 then may be executed, for example, to return to command 905.

As previously noted, the buffer access mode may facilitate storage of a sequence of commands until triggered to initiate the sequence. FIG. 0.11 shows an exemplary buffer B 1100 that receives and stores a sequence of commands according to a buffer access mode. In FIG. 11, the first stored command 1105 is a wait command that waits until the sequence is triggered before initiating the remaining stored sequence of commands. The buffer B 1100 stores commands 1105 to 1170 and 1180 as well as data block 1175.

A fourth access mode may provide buffer access that signals to an IOP to begin execution of a previously loaded program. For example, a received PCI instruction may include a header visible to an IOP, the header including relevant instructions for initiating a sequence of commands.

This buffer execute mode may be used when preprogrammed sequences in the IOP can be used to perform a series of tasks, and may be used to construct response packets that are written back to the host. In this access mode, if a PCI read instruction causes the IOP program execution, the read instruction will also contain a PCI read tag and a length. Therefore, the PCI response to the read instruction must contain an appropriate PCI read completion tag and must be of the proper length.

In this access mode, a PCI address provided in the instruction header may represent the address of, or a pointer to, the program to execute. For example, a program may be loaded into an IOB using the buffer access mode as described above. Then upon receipt of a PCI instruction with a pointer to the program in the address space, an associated IOP may be flagged or triggered to initiate execution of the program (e.g. by performing the instructions loaded into the IOB).

According to an embodiment, information received with the PCI header may be loaded into a register such that the update to the register flags the IOP to begin processing. Then, the program or series of steps stored in the associated IOB will begin execution. The ultimate actions performed by the IOP are determined by the pre-existing program stored in the IOB.

For write instructions received in buffer execute more, the payload data may contain information which can be seen by the IOP. For example, an included word may be a parameter of the program.

For read instructions received in the buffer execute mode, a PCI read completion tag and length information provided with the instruction may be loaded into a register as well as the IOB address/pointer.

Figure 12:
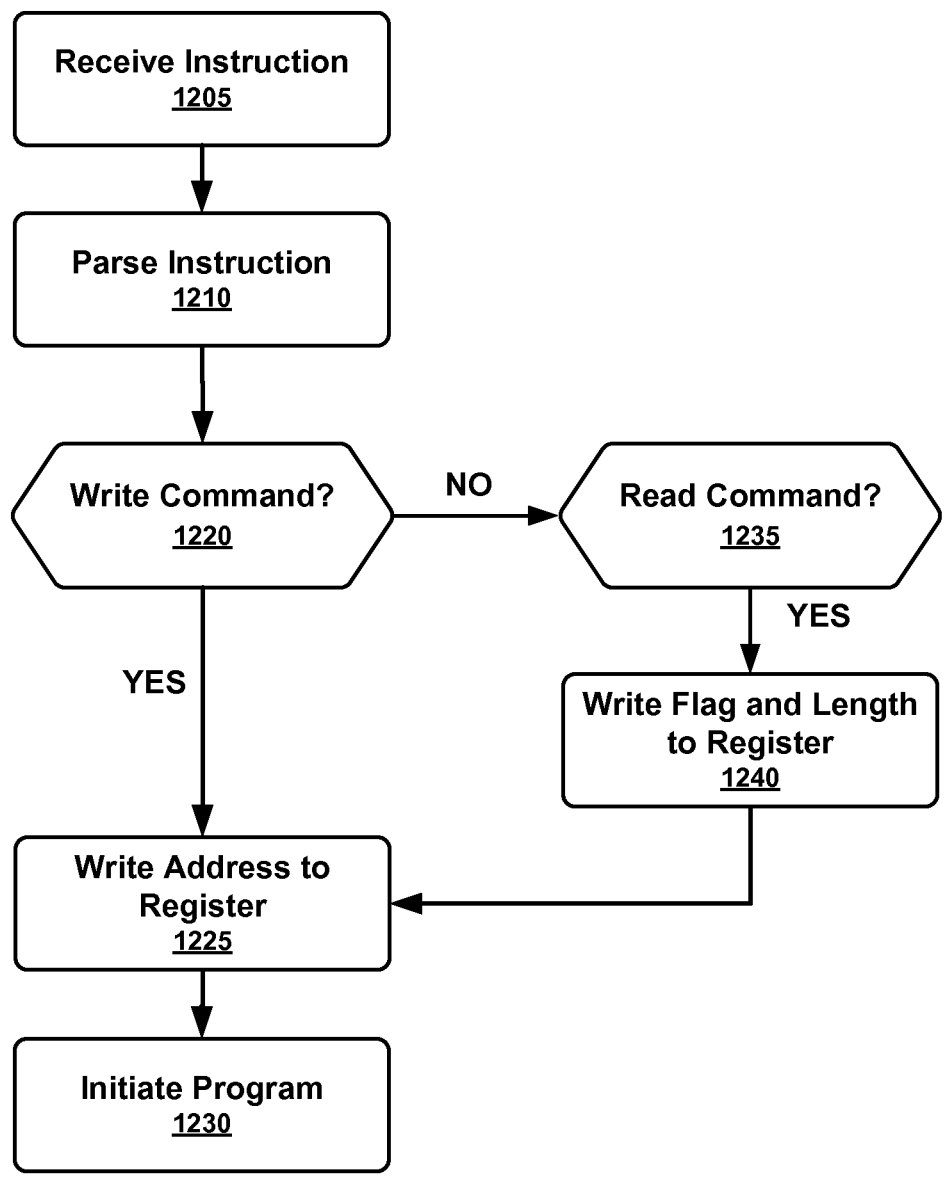
FIG. 12 illustrates an exemplary method for using the emulation system according to a buffer execute mode to execute pre-programmed commands in a data buffer.

FIG. 12 illustrates an exemplary method 1200 for using the emulation system according to buffer execute mode. In FIG. 12, an instruction will be received at in interface (block 1205) and parsed to identify information in a header and a payload of data (block 1210). Information in the header may then be identified and processed by the PCI host interface. If the received instruction is a write command (block 1220), the PCI host interface may load a provided address into a register (block 1230) and initiate the program in the addressed IOB (block 1235). If the instruction is not a write command (block 1220), the instruction may be a read command (block 1240). For a read command, the original IOP may load a PCI read completion flag and a length into a register (block 1245) as well as the address into a register (block 1230) and initiate the program in the addressed IOB (block 1235). According to an embodiment, writing to the register may itself trigger the program. An IOP will step through the commands and data stored in the IOB to execute the stored program.

The execute buffer access mode may facilitate potential acceleration of a simulation cycle. For example, commands may be stored in one buffer, until triggered by the host to start the cycle of stored commands. A predetermined number of cycles may then be executed.

Figure 13:
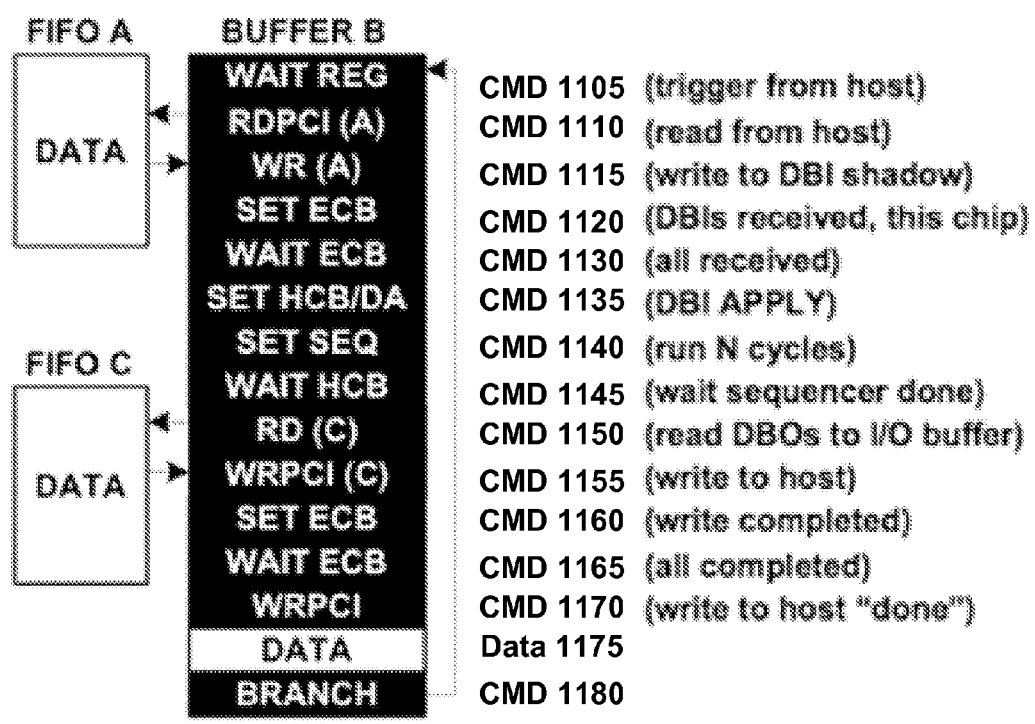
FIG. 13 illustrates the execution of commands in an exemplary buffer according to a buffer execute access mode.

An exemplary buffer storing a sequence of commands was previously illustrated in FIG. 11. FIG. 13 illustrates the execution of the commands in buffer B 1100. In FIG. 13, buffer B 1100 receives and stores a sequence of commands where the first stored command 1105 is a wait command that waits until the sequence is triggered, for example by the host writing to a register, before initiating the remaining stored sequence of commands. Then, IOP B associated with buffer B 1100 may step though the sequence of commands and data and perform the instructions provided in the commands. As shown in FIG. 13, this may include accessing write command 1110 which will execute a read instruction that reads data from the host PCI device such that the read data will be written to FIFO buffer A, then accessing write command 1115 which will write the data from the FIFO buffer A to an input register (e.g., a Data Bits In (DBI) register). Then the IOP may set an ECB that indicates that the data has been received for the associated IOP as instructed by command 1120 and wait for an ECB trigger that signals when all the data has been received for all the IOPs as instructed by command 1130. Then, a register trigger may be set, as instructed by command 1135, to set a trigger for a certain register value (a DBI apply command). The IOP may then run a predetermined number of cycles as instructed by command 1140. Once the predetermined number of cycles has been completed, the IOP may wait until an HCB trigger indicates that all of the IOPs have completed their cycles as instructed by command 1145. Then the output data bits (DBOs) resulting from the cycles may be read to an IOB such as FIFO buffer C as instructed by command 1150. The data in buffer C may then be written to the host via a PCI write as instructed in command 1155, and an ECB may be set indicating completion of the write as instructed in command 1160. At command 1165, the IOP may be instructed to wait until a trigger indicates that all of the IOPs have completed the write command. Then a final write is performed as instructed by command 1170 which writes data 1175 to the host alerting the host that all of the IOPs have completed the predefined cycles and a branch command 1180 may be initiated that returns to the first command 1105 to wait for a trigger to begin the sequence again.

A fifth access mode may provide for access to registers provided by the PCI Host Interface Logic, the PCI Core, and registers used to control and debug IOPs. Using this access mode, these registers may be accessed without going through the internal system bus or otherwise accessing the internal system memory.

In this access mode, a register access request will be received, and a register address will be included in the request information. Then the IOP associated with the addressed register will access the requested register.

Figure 14:
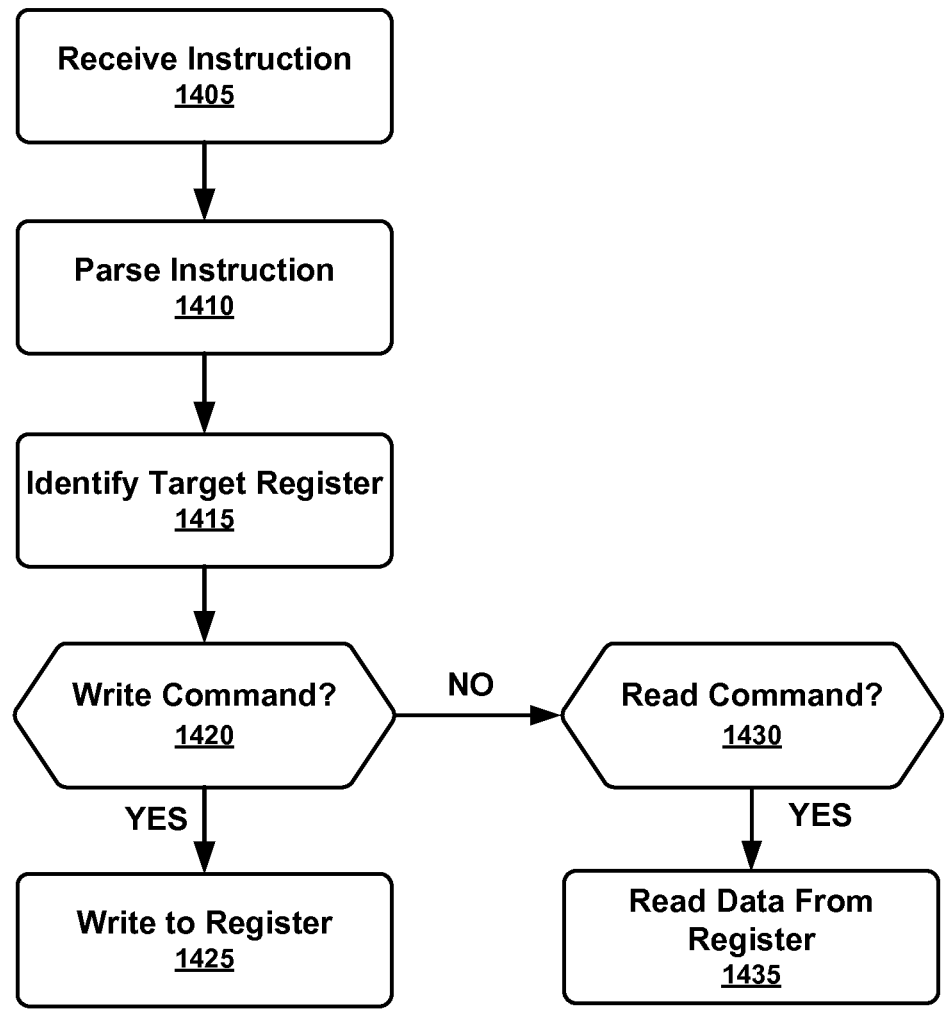
FIG. 14 illustrates an exemplary method for using the emulation system according to a register access mode.

FIG. 14 illustrates an exemplary method 1400 for using the emulation system according to an access register access mode. In FIG. 14, an instruction will be received at an interface (block 1405) and parsed to identify a header and potentially a payload of data (block 1410). An address in the header may then be identified and processed by the PCI host interface (block 1415). The address information may identify a target register. If the instruction is a write command (block 1420), the payload data will be written to the target register as identified (block 1425). If the instruction is not a write command (block 1420), the instruction may be a read command (block 1430). Then, the data in the addressed register will be read and passed to an associated buffer before being returned by an IOP to the requesting device (block 1435).

According to an embodiment (not shown), an IOP may be configured to operate in an access mode and a received instruction will be interpreted in that access mode, without reference to the contents of the instruction.

In some applications, the modules described hereinabove may be provided as elements of an integrated software system, in which the blocks may be provided as separate elements of a computer program. Some embodiments may be implemented, for example, using a non-transitory computer-readable storage medium or article which may store an instruction or a set of instructions that, if executed by a processor, may cause the processor to perform a method in accordance with the embodiments. Other applications of the present invention may be embodied as a hybrid system of dedicated hardware and software components. Moreover, not all of the modules described herein need be provided or need be provided as separate units. Additionally, the arrangement of the blocks in FIGS. 3, 7, 8, 12, and 14 do not necessarily imply a particular order or sequence of events, nor are they intended to exclude other possibilities. By way of non-limiting example, the operations depicted at blocks 315, 320, and 340 may occur in any order or substantially simultaneously with each other. Such implementation details are immaterial to the operation of the present invention unless otherwise noted above.

The exemplary methods and computer program instructions may be embodied on a non-transitory computer readable storage medium that may include any medium that can store information. Examples of a computer readable storage medium include electronic circuits, semiconductor memory devices, ROM, flash memory, erasable ROM (EROM), floppy diskette, CD-ROM, optical disk, hard disk, fiber optic medium, or any electromagnetic or optical storage device. In addition, a server or database server may include computer readable media configured to store executable program instructions. The features of the embodiments of the present invention may be implemented in hardware, software, firmware, or a combination thereof and utilized in systems, subsystems, components or subcomponents thereof.

While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. A method for interfacing to an emulation device, the method comprising:
receiving, with the emulation device, an instruction created as part of a function required by an emulation of a circuit design, wherein the instruction includes a field identifying the instruction as one of a plurality of potential data access mode instructions;
identifying, with the emulation device, a target buffer from address data in the instruction;
writing, with the emulation device, any payload data received with the instruction into the target buffer;
executing, with the emulation device, one of the plurality of potential data access mode instructions identified in the field;
wherein:
for an instruction identified as a direct memory access mode instruction:
if the instruction is a write command:
writing the data in the target buffer to a memory system based on a target memory address provided in the instruction;
if the instruction is a read command:
reading data stored at a target memory address provided in the instruction to the target buffer;
returning the data from the target buffer in a read response;
for an instruction identified as a mode instruction other than a direct memory access mode instruction:
if the instruction is a write command, using a processor associated with the target buffer, stepping through the data in the target buffer and executing any commands embedded in said data;
if the instruction is a read command, returning the data from the target buffer in a read response;
such that said emulating facilitates manufacture of an integrated circuit that includes said circuit design.

2. The method of claim 1, further comprising, setting a mode for the target buffer.

3. The method of claim 2, wherein said mode is a FIFO mode, such that in FIFO mode, the target buffer is configured as an input-output FIFO pair.

4. The method of claim 2, further comprising, if data is written to the buffer in a mode different than the set mode, flushing the buffer and raising an error.

5. The method of claim 1, wherein said processor waits until a trigger event to begin stepping through the data in the target buffer.

6. The method of claim 5, wherein said trigger event is a change in a register value.

7. The method of claim 1, wherein said instruction is identified as a buffer access mode instruction, said target buffer is set to a buffer mode, and said data contains only one or more blocks of data and a second processor associated with a second buffer executes commands stored in the second buffer that operate on said one or more blocks of data.

8. The method of claim 1, further comprising:
receiving a second instruction identified as a buffer execute access mode instruction;
writing address information received with the second instruction to a register identified in the instruction;
if the second instruction is a read command, writing a read flag and length information received with the second instruction to a register; and
triggering said stepping through the data in the target buffer.

9. The method of claim 1, wherein said instruction is identified as a buffer access mode instruction, said target buffer is set to a buffer mode, and said data contains a command that branches or jumps.

10. The method of claim 1, wherein said instruction is identified as a FIFO access mode instruction, said target buffer is set to a FIFO mode, and said data contains a sequence of write commands and blocks of data and during said stepping, said processor writes each block of data to the memory system.

11. The method of claim 10, wherein each write command in the data includes a target memory address for the write.

12. The method of claim 1, wherein said instruction is identified as a register access mode instruction and said processor reads or writes data to a register identified from information in the instruction.

13. A system comprising:
an interface to receive an instruction created as part of a function required by an emulation of a circuit design and to identify a target buffer from address data in the instruction, wherein the instruction includes a field identifying the instruction as one of a plurality of potential data access mode instructions;
a memory system;
a plurality of buffers, wherein payload data received with the instruction is written to the target buffer identified as one of the plurality of buffers; and
a plurality of processors, wherein at least one processor is associated with the target buffer and executes the one of the plurality of potential access mode instructions identified in the field such that:
for instructions identified as a direct memory access mode instruction:
if the instruction is a write command, the processor writes the data in the target buffer to a memory system based on a target memory address provided in the instruction;
if the instruction is a read command, the processor reads data stored at a target memory address provided in the instruction to the target buffer and returns the data from the target buffer in a read response;
for instructions identified with a mode different from the direct memory access mode:
if the instruction is a write command, the processor steps through the data in the target buffer and executes any commands embedded in said data;
if the instruction is a read command, the processor returns the data from the target buffer in a read response,
such that the system facilitates the circuit design for a manufacturable integrated circuit.

14. The system of claim 13, wherein said processor waits until a trigger event to begin stepping through the data in the target buffer.

15. The system of claim 14, wherein said interface:
receives a second instruction identified as a buffer execute access mode instruction and writes address information received with the second instruction to a register identified in the second instruction;
if the second instruction is a read command, writes a read flag and length information received with the second instruction to a register; and
triggers said stepping through the data in the target buffer.

16. The system of claim 13, wherein said instruction is identified as a buffer access mode instruction, said target buffer is set to a buffer mode, and said data contains only one or more blocks of data and a second processor associated with a second buffer executes commands stored in the second buffer that operate on said one or more blocks of data.

17. The system of claim 13, wherein said instruction is identified as a buffer access mode instruction, said target buffer is set to a buffer mode, and said data contains a command that branches or jumps.

18. The system of claim 13, wherein said instruction is identified as a FIFO access mode instruction, said target buffer is set to a FIFO mode, said data contains a sequence of write commands and blocks of data and during said stepping, said processor writes each block of data to the memory system.

19. The system of claim 13, wherein said instruction is identified as a register access mode instruction and said processor reads or writes data to a register identified from information in the instruction.

20. A method for interfacing to an emulation device, the method comprising:
configuring a processor to operate according to one of a plurality of potential data access modes;
receiving an instruction at the processor created as part of a function required by an emulation of a circuit design, wherein the instruction includes a field identifying the instruction as the one of the plurality of potential data access modes;
identifying, with the processor, a target buffer from address data in the instruction;
writing, with the processor, any payload data received with the instruction into the target buffer;
executing, with the processor, the one of the plurality of potential data access modes identified in the field;
wherein:
for an instruction received by the processor configured in a direct memory access mode:
if the instruction is a write command:
writing the data in the target buffer to a memory system based on a target memory address provided in the instruction;
if the instruction is a read command:
reading data stored at a target memory address provided in the instruction to the target buffer;
returning the data from the target buffer in a read response;
for an instruction received by the processor configured in a mode other than a direct memory access mode:
if the instruction is a write command, using the processor, stepping through the data in the target buffer and executing any commands embedded in said data;
if the instruction is a read command, returning the data from the target buffer in a read response;
such that said emulating facilitates manufacture of an integrated circuit that includes said circuit design.

21. The method of claim 20, wherein said processor waits until a trigger event to begin stepping through the data in the target buffer.

22. The method of claim 20, wherein said processor is configured in a buffer access mode, said target buffer is set to a buffer mode, and said data contains only one or more blocks of data and a second processor associated with a second buffer executes commands stored in the second buffer that operate on said one or more blocks of data.

23. The method of claim 21, further comprising:
receiving a second instruction at a second processor configured in a buffer execute access mode;
writing address information received with the second instruction to a register identified in the instruction;
if the second instruction is a read command, writing a read flag and length information received with the second instruction to a register; and
triggering said stepping through the data in the target buffer.

24. The method of claim 20, wherein said processor is configured in a buffer access mode, said target buffer is set to a buffer mode, and said data contains a command that branches or jumps.

25. The method of claim 20, wherein said processor is configured in a FIFO access mode, said target buffer is set to a FIFO mode, and said data contains a sequence of write commands and blocks of data and during said stepping, said processor writes each block of data to the memory system.

26. The method of claim 20, wherein said processor is configured in a register access mode instruction and said processor reads or writes data to a register identified from information in the instruction.

\* \* \* \* \*